United States Patent [19]

Anderson et al.

[11] 4,217,643
[45] Aug. 12, 1980

[54] SPEED MAINTAINING CONTROL OF TRAIN VEHICLES

[75] Inventors: Larry W. Anderson; Arun P. Sahasrabudhe, both of West Mifflin, Pa.

[73] Assignee: Westinghouse Electric Corp., Pittsburgh, Pa.

[21] Appl. No.: 920,319

[22] Filed: Jun. 28, 1978

[51] Int. Cl.$^2$ .......................... B61L 3/20; B61L 27/04
[52] U.S. Cl. ............................... 364/426; 246/182 R; 246/187 R; 364/424
[58] Field of Search ............................... 364/424, 926; 246/182 R, 182 B, 182 C, 187 R, 187 A, 187 B, 187 C

[56] References Cited

U.S. PATENT DOCUMENTS

| | | | |
|---|---|---|---|
| 3,655,962 | 4/1972 | Koch | 364/426 |
| 3,790,778 | 2/1974 | Oster | 246/182 C |
| 3,934,125 | 1/1976 | Macano | 364/426 |
| 4,005,837 | 2/1977 | Grundy | 364/426 |
| 4,005,838 | 2/1977 | Grundy | 364/426 |
| 4,118,774 | 10/1978 | Franke | 364/431 |

FOREIGN PATENT DOCUMENTS 2344328  3/1974  Fed. Rep. of Germany ....... 246/182 B

OTHER PUBLICATIONS

Gibson: Bay Area Transit System will have Automated Central Control, Westinghouse Engineer, Mar. 1970, pp. 51–54.
Hoyler: Design Techniques for Automatic Train Control, Westinghouse Engineer, Jul. 1972, pp. 98–103.
Hoyler: Automatic Train Control Concepts are Implemented by Modern Equipment, Westinghouse Engineer, Sep. 1972, pp. 145–151.
IAS Annual Meeting 1977: Sao Paulo Metro E-W Line Innovations, IAS Annual 1977, pp. 1105–1109.
Bollinger: The Bartd Train Control System, Railway Signalling and Communications, Dec. 1967.
Brownson et al.: Bart Controls, Railway Signalling and Communications, Jul. 1969, pp. 27–38.
Throne-Booth: Signaling of Remotely Controlled Railway Trains, IEEE Transactions on Communication Technology, vol. Com-16, No. 3, Jun. 1968, pp. 369–374.

*Primary Examiner*—Felix D. Gruber
*Attorney, Agent, or Firm*—R. G. Brodahl

[57] ABSTRACT

There is disclosed a passenger vehicle speed maintaining control apparatus and method, including program microprocessor control apparatus for controlling the vehicle speed in response to an acceleration or tractive effort request P signal.

11 Claims, 8 Drawing Figures

| ADDRESS | | LABEL |
|---|---|---|
| 0E50 | | K1 |
| 0E51 | | K2 |
| 0E52 | | K3 |
| 0E53 | | PSIG1 |
| 0E54 | | PI |
| 0E56 | | PII |
| 0E58 | | UNDER |
| 0E59 | | PP |
| 0E5A | | PIMAX |
| 0E5B | | PSFLG |
| 0E5C | | SPDER |
| 0E5D | | K3TMP |
| 0E5E | | PSFG1 |
| 0EF9 | | OUT61 |
| 0E0D | | VELAC |
| 0E09 | | VELPS |
| 0E36 | | VELLA |
| 0E0F | | PSIG |
| 0E0E | | PMACC |
| 0EF6 | | IN73 |
| 0EF5 | | ACTSP REF |

SPEED MAINTAINING CONTROL OF TRAIN VEHICLES

CROSS-REFERENCE TO RELATED APPLICATIONS

The present application is related to the following concurrently filed patent applications which are assigned to the same assignee as the present application; and the respective disclosures of which are incorporated herein by reference:

1. Ser. No. 920,318, which was filed on June 28, 1978 by D. L. Rush and entitled "Program Stop Control Of Train Vehicles";
2. Ser. No. 920,317, which was filed on June 28, 1978 by D. L. Rush and L. W. Anderson and M. P. McDonald and entitled "Speed Decoding And Speed Error Determining Control Apparatus And Method";
3. Ser. No. 920,043, which was filed on June 28, 1978 by M. P. McDonald, T. D. Clark and R. H. Perry and entitled "Train Vehicle Control Multiplex Train Line";
4. Ser. No. 920,104, which was filed on June 28, 1978 by D. L. Rush and J. K. Kapadia and entitled "Door Control For Train Vehicles";
5. Ser. No. 920,316, which was filed on June 28, 1978 by L. W. Anderson and M. P. McDonald and entitled "Train Vehicle Control Microprocessor Power Reset"; and
6. Ser. No. 920,315, which was filed on June 28, 1978 by D. L. Rush and A. P. Sahasrabudhe entitled "Desired Velocity Control For Passenger Vehicles".

BACKGROUND OF THE INVENTION

The present invention relates to the automatic control of passenger vehicles, such as mass transit vehicles or the like, and including speed control and speed maintenance while moving along a track.

In an article entitled the BARTD Train Control System published in Railway Signaling and Communications for December 1967 at pages 18 to 23, the train control system for the San Francisco Bay Area Rapid Transit District is described. Other articles relating to the same train control system were published in the IEEE Transactions On Communication Technology for June 1968 at pages 369 to 374, in Railway Signaling and Communications for July 1969 at pages 27 to 38, in the Westinghouse Engineer for March 1970 at pages 51 to 54, in the Westinghouse Engineer for July 1972 at pages 98 to 103, and in the Westinghouse Engineer for September 1972 at pages 145 to 151. A general description of the train control system to be provided for the East-West line of the Sao Paulo Brazil Metro is provided in an article published in IAS 1977 Annual of the IEEE Industry Applications Society at pages 1105 to 1109.

A general description of the microprocessors and the related peripheral devices is provided in the Intel 8080 Microcomputer Systems Users Manual currently available from Intel Corp., Santa Clara, Calif. 95051.

SUMMARY OF THE INVENTION

An improved passenger vehicle speed control apparatus and method are provided including hardware and software to control the speed of a train vehicle by means of an acceleration request or P signal, as based on the maximum speed allowed established by received speed code, the cutout car condition, performance level, and the program stop information from the program stop routine. This is done by selecting the desired speed for the vehicle to go and then comparing that against the actual vehicle speed from the tachometer information and thereby determining the P signal request. The desired speed is either the action velocity or the program stop velocity. The look ahead velocity is compared against the action velocity and when the look ahead velocity becomes less than the action velocity plus an offset, the desired speed is the program stop velocity, otherwise the desired speed is the action velocity. The offset is a function of the P signal request at that present time which is an indication of whether or not the vehicle is accelerating, decelerating towards that action velocity or just speed maintaining at that action velocity.

DESCRIPTION OF A PREFERRED EMBODIMENT

Figure 1:
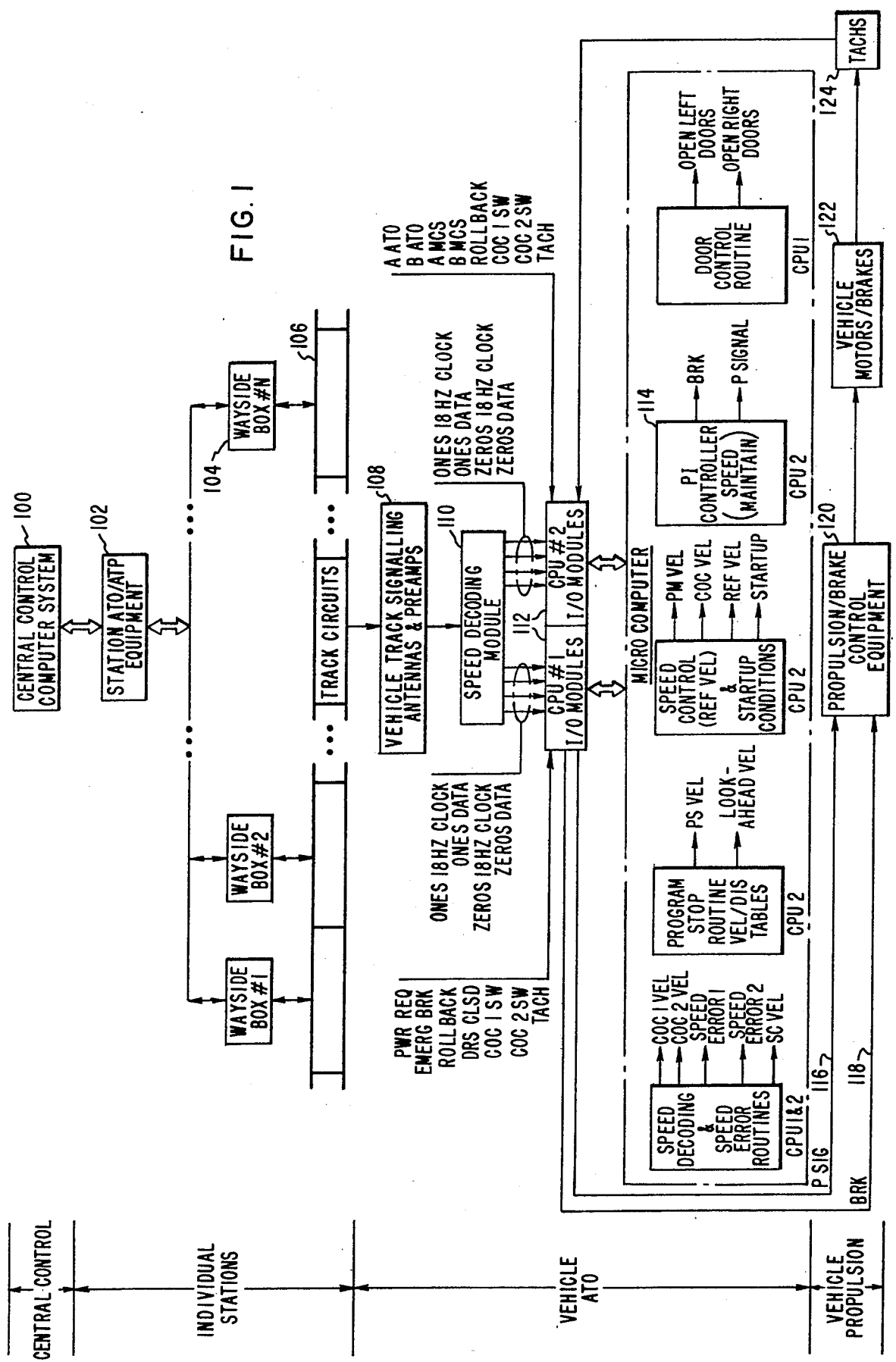
FIG. 1 is a schematic showing of the passenger vehicle velocity control system operative in accordance with the present invention.

As shown in FIG. 1 the central control computer system 100 communicates with the station ATO and ATP equipment 102 to establish the proper vehicle routes and to set up desired speed profiles for the track circuits by sending this information to the wayside boxes 104. This puts the speed code information on the track circuits 106 in the form of command speed codes. These speed codes are received by the vehicle antennas and preamplifiers for the antennas 108 and go into the speed decoding module 110 which takes the FSK serial speed codes and converts them into serial logic level data as indicated to the right and the left of the speed decoding module 110. This information goes into the two microprocessors CPU 1 and CPU 2 for each individual train as the train is progressing down the track. In particular, the input/output modules 112 is operative with CPU No. 2, and CPU 2 has stored within its memory a decoded maximum allowable speed. Also within the memory of CPU 2 is an indication of the last received performance modification from the ID system. The PI controller speed maintaining program 114 performs the vehicle speed maintaining function and generates a P-signal and a brake signal. The characteristics of the brake signal are such that if it is a logic 1 which is defined as 100 milliamps, this permits the train vehicle to be in power and if it is a logic zero, which is defined as 0 milliamps, the train vehicle is in brake. The P signal is such that 60 milliamps is its mid-scale range and the train vehicle wants to essentially coast with a 60 milliamp P signal; from 60 up to 100 milliamps is the normal power range and from 60 down to 20 milliamps is the normal brake range. A P signal of 20 milliamps would call for full service brakes and a P signal of 100 milliamps would call for maximum acceleration. The P signal 116 and the brake signal 18 are shown coming out of the CPU modules 112 since the CPU and I/O modules are the actual hardware that is where the signals originate, whereas the program 114 is the software contained within the CPU 2. In the hardware, there is an analog signal out of the I/O module of CPU 2 which goes to a P signal generator module that converts that analog signal having a value from −2 to −10 volts into a 20 to 100 milliamp P signal and then there is a logic level coming out of CPU 2 I/O module which goes over to a P and brake signal generator module to turn the brake signal generator on or off as required to generate the 100 milliamps or 0 milliamps. The P signal and the brake signal are put on train lines and go to each car vehicle for a multiple car vehicle train. The only CPU 2 doing this speed maintaining function is in the head end car. However, the P and brake signals go to the propulsion and brake equipment 120 on each car. The propulsion brake control equipment 120 then converts these signals into motor current request and brake pressure request. The vehicle motors and brakes 122 control the actual train velocity. The train velocity is sensed by tachometers 124 physically mounted on the motor axles, and the tachometer signals then come back into the CPU 2 as a speed feedback. The function of the speed maintaining program 114 is to first determine what desired speed of the vehicle should be and then try to control the vehicle speed through the P signal and the brake signal such that the tachometer feedback agrees with that desired speed.

Figure 2:
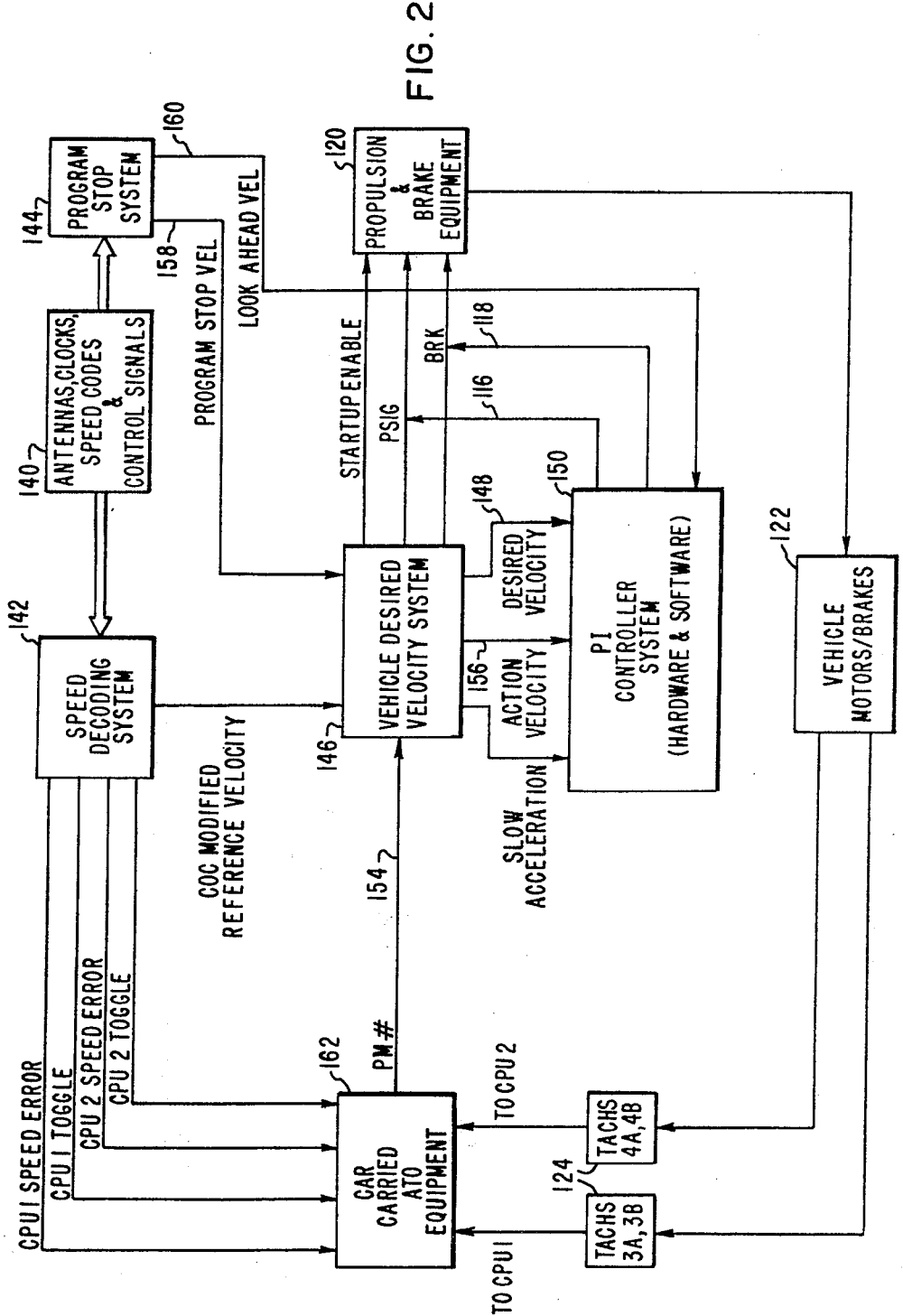
FIG. 2 illustrates the microprocessor control apparatus provided for the control of a passenger train vehicle including the present speed maintaining operation.

In FIG. 2 there is shown in more detail the speed maintaining PI Controller System, including hardware and software, in relation to a train vehicle speed control system. The vehicle antennas 140 provide speed code and control signals, such as the cutout car signals. The speed code information is supplied to the speed decoding system 142, and also the program stop related information is supplied to the program stop subsystem 144. The speed decoding system 142 provides the maximum allowable speed modified for the cutout cars, and this goes to the vehicle desired velocity system 146. The actual desired velocity input 148 into the speed maintaining controller system 150 is a combination of the reference velocity input 152 from the speed decoding system 142 and the PM number 154 to provide an action velocity variable 156 which is stored in the CPU and is generated by the speed decoding system 142. The program stop velocity 158, the look ahead velocity 160 and the action velocity 156 are utilized to determine the velocity 148. The action velocity is the maximum speed modified by cutout cars and modified by the PM speed requirements. There is also a PM acceleration limit such that the decoded PM code results in a limit to one-half acceleration which is a direct input into the speed maintaining controller system 150. The desired velocity 148 uses this PM acceleration limit information or program stop velocity information, whichever is more restrictive. Also, the action velocity is modified by subtracking either 2 or 4 KPH, with the action velocity being an absolute maximum for controlling the vehicle speed below the action velocity, but not too far below it, or the vehicle station to station run times will be increased.

After the desired velocity 148 is established and whether the vehicle is allowed full acceleration or half acceleration, the PI controller system 150 then operates a software PI controller to generate the P signal 116 and the brake signal 118, which go to the propulsion and brake equipment 120. The propulsion and brake equipment 120 controls the motor vehicle 122, including the vehicle motor and brake. The vehicle is coupled to the tachometers 124. In reality 4 tachometers are provided, with tachometer 4a being used for the speed feedback, although any one of them could be used to provide this speed feedback signal. For the actual speed maintaining controller system 150, only one tachometer 4A is used, and the actual speed signal gets fed back to the car carried ATO equipment 162.

The desired velocity 148 that the PI controller system 150 is trying to maintain is a function of the mode that the vehicle is in; in other words a dual aiming point is present depending upon whether the vehicle was in power or in brake. An objective of the PI controller system 150 operation is to cut down on the number of power and brake mode change transitions.

Figure 3A:
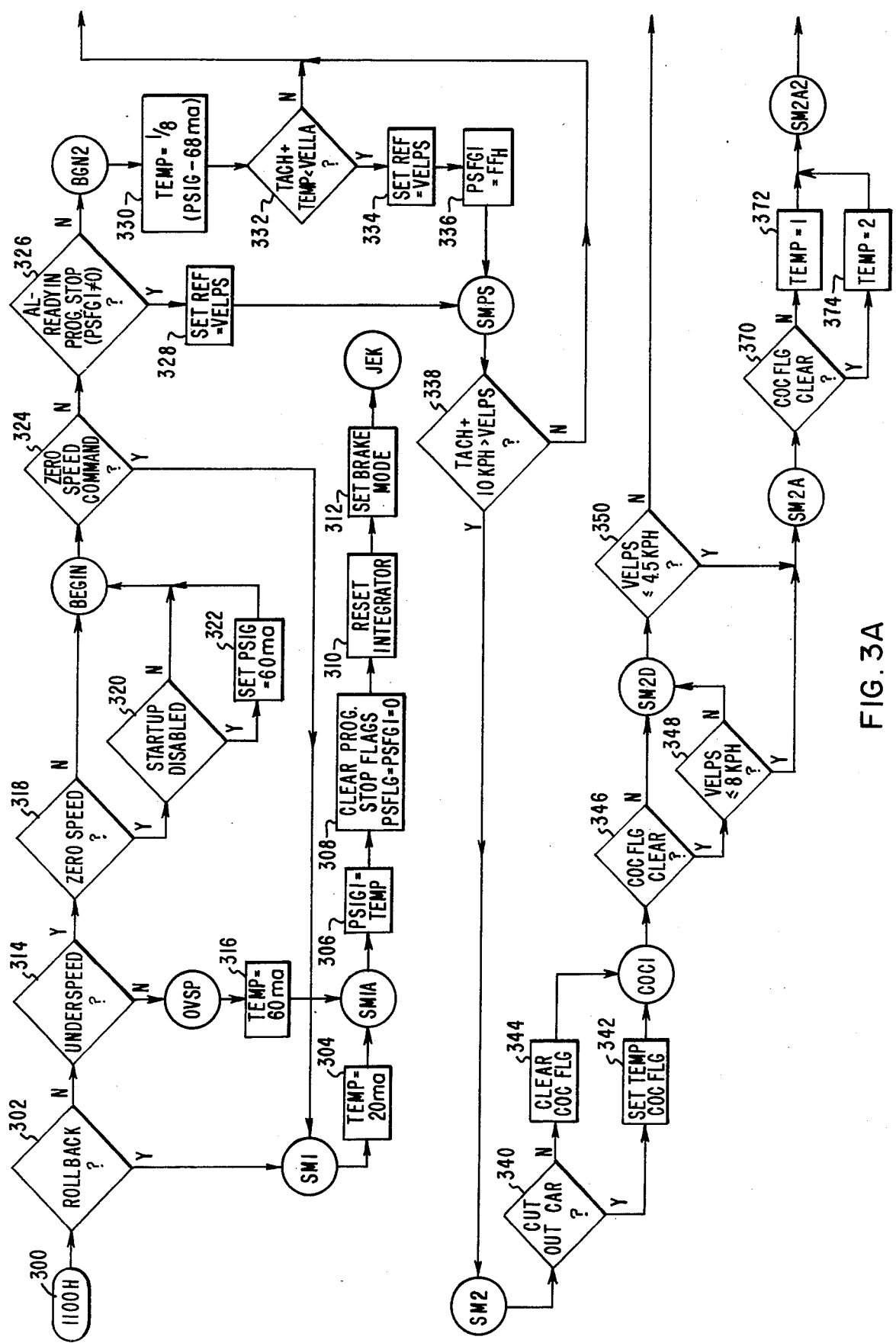
FIGS. 3A, 3B, 3C and 3D illustrate the flow charts of the provided program routines in accordance with the present invention.

The program routine shown in FIG. 3A has at this time available as information inside the computer the action velocity 156 which is determined by the received speed codes modified by the cutout car information and further modified by PM level, a program stop velocity 158, and a program stop look ahead velocity 160, which is the velocity the program stop program thinks the vehicle should be going at approximately one second in the future. In addition, there is an indication whether or not the performance modification wants the limit of one-half acceleration, and there is the actual speed that the train vehicle is moving at present. The PI controller system 150 will generate a P signal level, which will be between 20 and 100 milliamps, and a brake signal which is going to be a 1 or a 0. The brake signal is just a logic signal to make sure that all the cars in the train are in the same mode. Other auxiliary information provided to the speed maintaining program includes a non-vital roll back indication from tachometers 4A and 4B to verify that the vehicle is going in the proper direction. The program shown in FIG. 3A starts at block 300. In block 302 a check is made to see if the vehicle is moving in the right direction, i.e. if a roll back indication is present. At block 304 the P signal is set to a value of 20 milliamps. At block 306 the P signal is passed through a jerk limiter to limit its rate of change and the PSIG1 is the input to the jerk limiter and PSIG is the output of the jerk limiter such that the output will get to 20 milliamps at its jerk limited rate. At block 308 some of the program stop flags are cleared. At block 310 the integral portion of the PI controller is reset to zero to keep it within the desired range of control. At block 312 the brake mode is set, since the request is for 20 milliamps of P signal and the only way to get into the brake mode is for the brake signal to be low. If there was no roll back at block 302 then at block 314 a check is made to see whether or not the vehicle is in an underspeed condition. The speed maintaining program is operating underneath the overspeed umbrella such that if at step 314 the vehicle is detected to be going faster than the maximum allowable speed based on the speed code information now being received from the track circuit, the P signal generator will be turned off and this speed maintaining program will lose control since the P signal, no matter what this program does with the P signal, is set to zero because the overspeed system has turned it off, and the overspeed system is requesting full service brakes. If block 314 detects that the overspeed condition exists, at block 316 the P signal is set in midrange and the program goes again to blocks 306, 308, 310 and 312 where the P signal is set to the temporary value of 60 milliamps, any program stop flags are cleared, the integral controller is reset, the brake mode is set and the P signal will jerk limit to 60 milliamps.

The reason for picking the 60 milliamps value at block 316 instead of again setting the P signal to 20 milliamps at block 304, is to avoid trouble coming out of overspeed. If the vehicle is going at some high speed and then gets a lower speed code, the vehicle is controlled to slow down to this lower speed code. At the point where the vehicle just goes below this overspeed value, the overspeed system permits the speed maintaining system 150 to control the vehicle and maintain the vehicle speed at a little below the overspeed limit. The prior art analog PI controller that was used in the past at this time had its output at 20 milliamps, and it did not start taking the brakes off immediately when the vehicle came out of overspeed. With the present control operation provided by step 318, when the vehicle comes out of overspeed the P signal is at 60 milliamps which immediately gets the brakes off because there is not much time available to try to lock onto this new desired speed code. To avoid this slow response of the brakes, when the vehicle first comes out of overspeed the control should ask for no brakes and then let the speed maintaining system 150 control the vehicle speed from there. At block 314 when the vehicle is detected to be in an underspeed condition, at block 318 a check is made to see if the vehicle is at 0 speed. If the vehicle is at 0 speed, at block 320 a check is made to see if the vehicle is ready to start moving; in other words if the start-up time gate and the logic which operates with the start-up time gate is saying 'go'. If the vehicle is stopped and should start moving, the start-up time gate provides a short duration signal to bypass and overcome the fact that there is no tachometer integrity detection. The vehicle is sitting at 0 speed, and to start it moving, it is necessary to bypass the tachometer integrity check to get the vehicle started. The speed maintaining program at step 320 looks at that situation to determine if the vehicle should start moving or should not start moving and it checks the start-up time gate at block 320. If the start-up is disabled, then again the P signal is set to 60 milliamps at step 322. Now when the start-up time gate output signal if found at block 320 and the vehicle should start moving, the speed maintaining program is then starting from a P signal of 60 milliamps and starts ramping from there essentially to avoid having to wait for the jerk limited time to get the brakes off since there is no actual jerk of the vehicle in going from full brake to no brake when the vehicle is already stopped, and this enables the vehicle to get started a little faster. At block 324 a check is made to see if a 0 speed command is received from the track circuit. If a zero speed command is sensed at block 324, the program goes through blocks 304 to 312 to set the P signal to 20 milliamps because the vehicle is getting a 0 speed command. If the vehicle is not receiving a zero speed command then at block 326 a check is made to determine whether or not the speed control is in program stop already, with the program stop flag PSFG1 set equal to 1. If the speed control at step 326 is found to be already in program stop, then at block 328 a check is made to see if the reference velocity called REF, which is the desired velocity, is equal to the program stop velocity. If the speed control is not in program stop, then at block 330, in an effort to determine how close the vehicle speed is to the program stop velocity profile, an offset is added to the vehicle actual speed for comparison with the look ahead velocity. If the vehicle is now positioned between stations, both the program stop velocity and the look ahead velocity are set at a value above the highest command speed code the vehicle will receive. If the vehicle is not actually in a program stop operation, then these checks will show that the vehicle is not in a program stop. At block 332 a check is made to see if the tach plus the added offset value temp is less than the look ahead velocity; and if not, then the vehicle is going at normal speed and is not in program stop, and the program goes to the label BGN1. However, if a program stop is found at step 332, then at block 334 the reference is set again to the program stop velocity, since this is the velocity the vehicle should follow. At block 336 the program stop flag PSFG1 is set equal to FF hex which is true, such that the next time the program comes through block 326 it will come out of the yes statement. Blocks 326 and 330 to 336 are provided to detect that the vehicle is in program stop, and once the program detects that the vehicle should be in program stop then the program just comes through blocks 326 and 328, since the vehicle is approaching or is on the program stop profile.

Block 338 is provided to check if for some reason the train is going too slow. Since the vehicle is in program stop mode and in the brake mode, the P signal will never go above 60 milliamps and the brake signal will never go to a logic 1, so if for some reason, such as the vehicle is going up a hill or there is a tremendous amount of drag on the vehicle, causing the vehicle to go too slow, it is desired for the speed control to come back out of the program stop mode, at block 338, to get back onto the normal speed maintaining mode, a check is made to see if the vehicle speed is 10 KPH below the program stop velocity, in other words, is the actual speed plus 10 KPH below this VELPS, which is the program stop profile velocity, and if so, the program goes to the BGN1 label which leads to normal speed maintaining and out of program stop. This check at step 338 normally would not provide a No output, but it could in theory, do so due to some abnormal vehicle situation so this option is included. Normally the program will come to block 340, where a check is made of the cutout car status; for program stop there is either a cutout car or there is not a cutout car. If the cutout car information indicates a cutout car switch is set by the operator, at step 342 a cutout car flag is set which is used later in the program, or the flag is cleared at step 344. Depending upon whether the cutout car flag is cleared or it is not cleared, the program now starts a flare out to help get the brakes off and follow the desired decreasing vehicle deceleration at the end of this program stop profile, and this is started at two different speeds, depending upon whether the vehicle is not or is in cutout car. Block 346 determines whether the cutout car flag is cleared, and if it is cleared, then block 348 checks to see if the program stop speed is equal to or less than 8 KPH. If the cutout car flag is not cleared, then at block 350 a check is made to see if the program stop velocity is equal to or less than 4½ KPH. If the program stop velocity is above both of these speeds, the program comes out the No end of block 350 up to block 352 where a check is made to see if the program stop flag PSFLG is set. If it is set at step 352, that indicates that the program has been through this path before, so it goes to the control portion of the program. If the program has not been through this path before, the program stop constants will have to be set. The PI controller requires three constants for its intended operation. There is a K1 constant which is the proportional gain constant, K2 which is the integral gain constant and K3 which is an offset or lead term. The first time through the program stop, these values are set to constants which can be unique to program stop and to change the characteristics of the PI controller system so that they more closely follow the program stop profile. It turns out in actual practice that in relation to the constants K1 and K2, no matter what mode the speed control is in, they are set the same. Blocks 354 and 356 set K1 and K2. At block 358 K3 temp is set to a value plus something which is proportional to the actual speed the vehicle is going. At block 360 the check is made to see whether or not the cutout car flag is set and whether or not the vehicle is in cutout car. K3 is set to this K3 temp at block 362 or it is set to half of K3 temp at block 364. These results were obtained experimentally and gave the best and smoothest following of the program stop profile. The constant K3 only gets used in program stop as a lead term since the speed control is trying to follow a ramp. Any other time when it is desired to maintain a constant velocity, the lead term is not needed. Since the program only goes through this path including steps 354 to 364 the first time the program detects that it should go into program stop, the integrator should be at a known value so again a momentary reset at block 366 is provided to reset the integrator to zero. The integrator now is in the controller, but this just initializes the integrator to a known value. The program stop flag PSFLG is set in block 368 to FF and the next time the program comes through the block 352 it goes immediately to the control section and skips presetting all these constants again.

Now if the vehicle gets below the speed where the program stop starts flaring out, which is coming out of the blocks 348 or 350, the program goes to block 370 to check the cutout car status and set a temporary register at block 372 or 374 to a value of 1 or 2. Since the vehicle deceleration in this area is going to be decreasing, the program starts pulling this K3 offset back towards 0, and this is done depending on the vehicle speed at two different rates and this is the reason for blocks 372 and 374. At block 376 K3 temp is set equal to K3 temp minus temp, for decreasing the K3 constant and then at block 378 the cutout car flag setting is checked such that based on the cutout car status the offset constant K3 is set to equal either K3 temp at block 380 or one-half of K3 temp at block 382. This decreases K3 temp by different amounts depending upon the cutout car status in block 370. In block 384, the proportional gain constant for the controller is changed. At block 386 the integral constant is left at the same value. By experimental testing both the proportional and integral gains were changed, but it was determined that the integral gain really did not have to be changed at this time although provision was made for changing the integral gain during this flare out if desired. The program now goes to the control section.

If the vehicle is not in program stop either at block 332 or 338 a no answer will take the program to the normal speed maintaining portion of the program. Since the vehicle is not in program stop, the program stop flags PSFLG and PSFG1 are both set equal to zero. At block 392 a comparison is made of the tach against the action velocity minus two. The action velocity is what the vehicle is going to be working with because the vehicle speed is definitely below the program stop profile and the vehicle is between stations and not in program stop. If the tach is greater such that the vehicle actual speed is greater than the action velocity maximum speed point minus 2 KPH, in other words the vehicle is higher in speed than 2 KPH below the action velocity so the vehicle should be in brake. At block 394 the reference velocity is set equal to the action velocity minus 2. At block 396 the brake mode is set and at blocks 398, 399 and 400 the K1, K2, K3 constants are set. At block 392 if the vehicle speed is not greater than the action velocity minus 2, at block 402 a check is made to see if the vehicle speed is less than 4 KPH below the action velocity to determine if the vehicle should be in the power mode. This illustrates the provided dead band, since the brake maintaining point is 2 KPH below the action velocity and the power maintaining point is 4 KPH below, so the vehicle speed can essentially drift between these two with no change in modes. It is only when the vehicle speed gets higher than 2 KPH below or lower than 4 KPH below that a mode change occurs. If the vehicle speed is more than 4 KPH below the action velocity, at block 404 the reference velocity is set equal to the action velocity minus 4 KPH, at block 406 the power mode is set, and blocks 408, 410 and 412 set the constants K1, K2 and K3 the same as blocks 398, 399 and 400 to have the same constants and the same system gains for power or brake. A provision is made to provide different constants in the brake mode as compared to the power mode. If the vehicle speed is in this deadband because it is below the higher speed at block 392 and above the lower speed at block 402, then at block 414 a check is made to see if the vehicle is in power. If the answer is yes, at block 416 the reference is set equal to the action velocity minus 4, because the vehicle should stay in power and that is the reference velocity for the power mode. If the vehicle is not in power at block 414, then it must be in brake, so at block 418 the reference velocity is set equal to the action velocity minus 2, because it should stay in brake and no mode setting is done because the mode is still set from where it was before. The program now goes to FIG. 3B of the speed maintaining program.

Figure 3B:
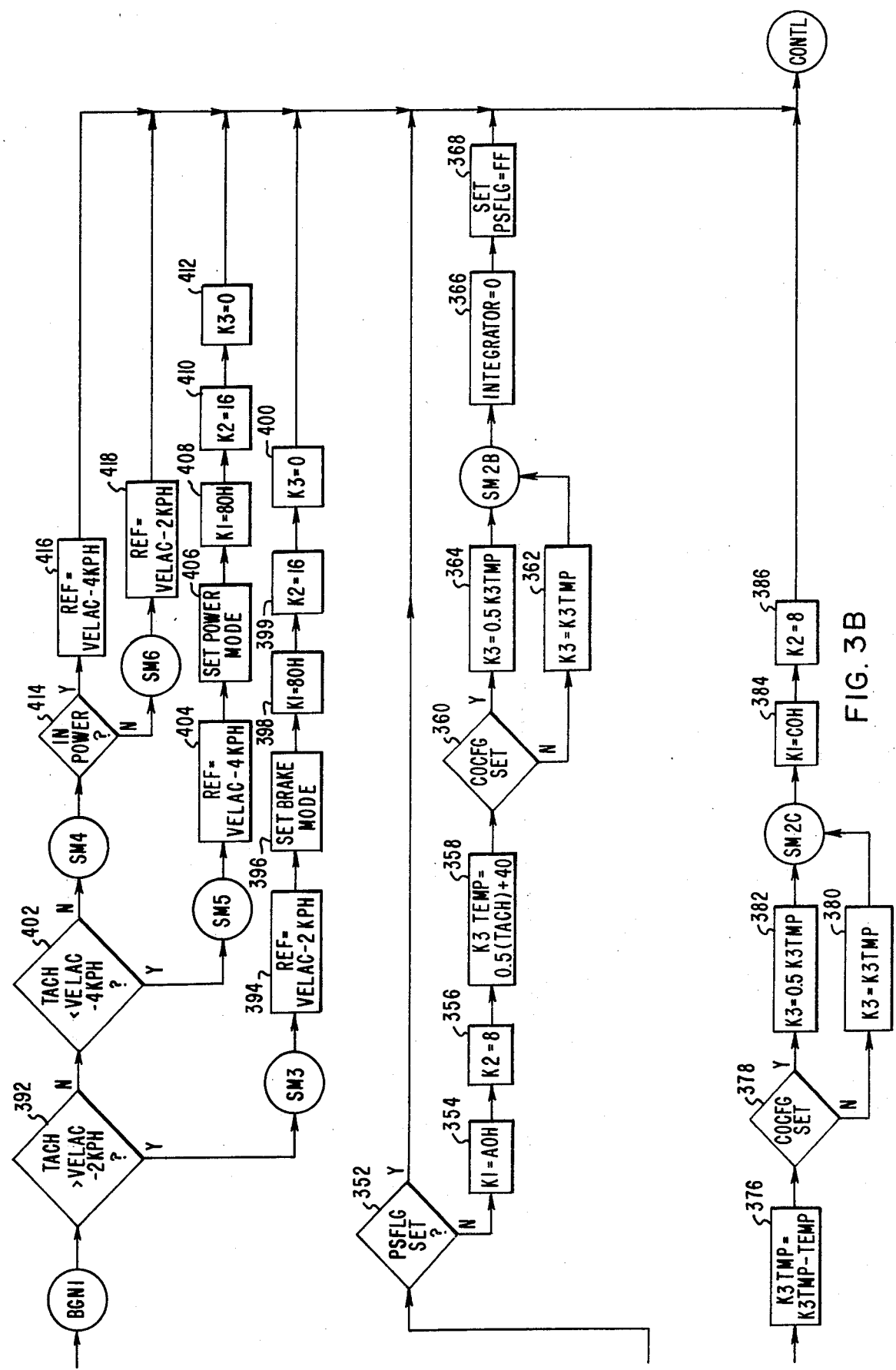
Figure 3C:
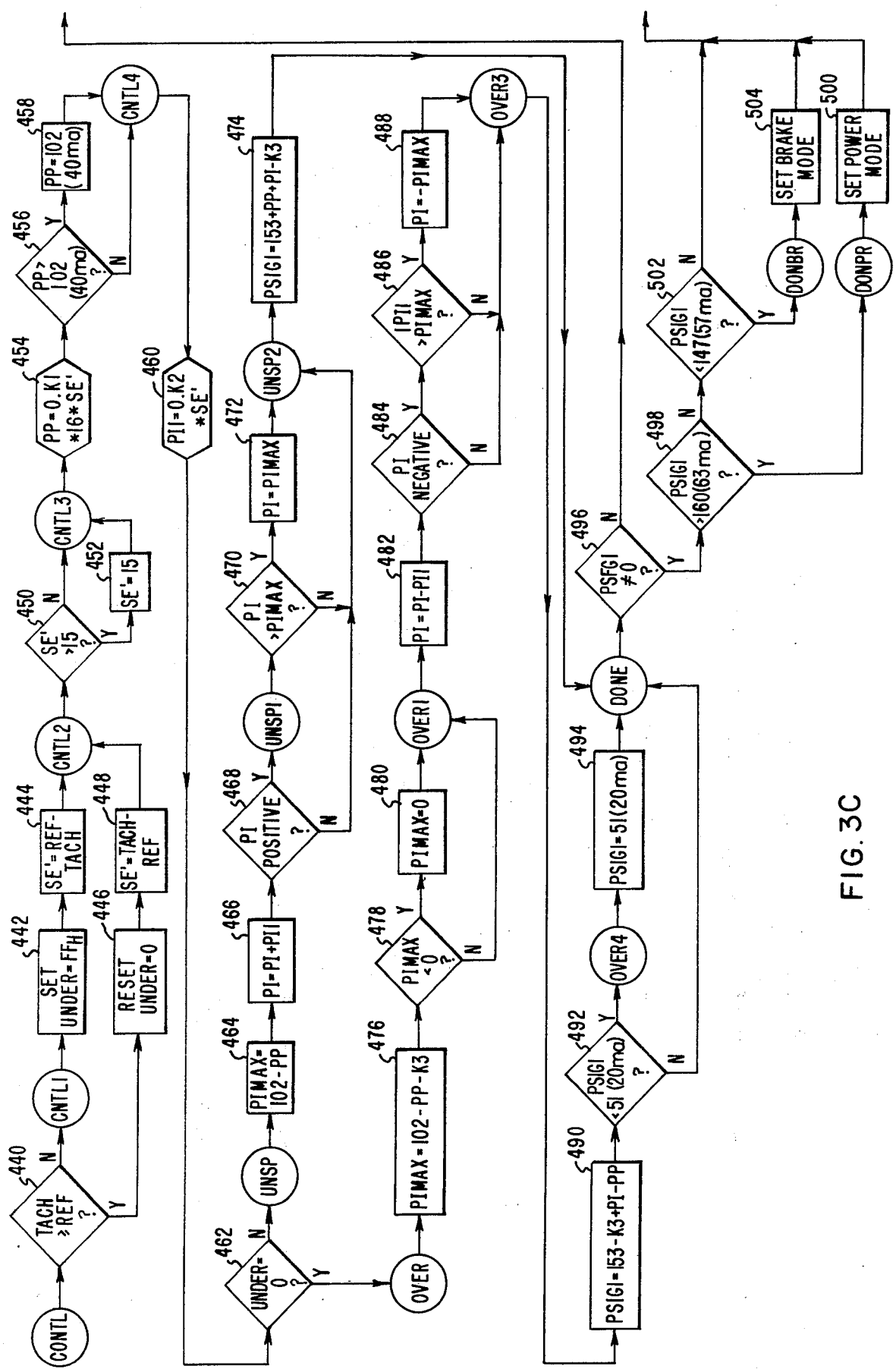
Figure 3D:
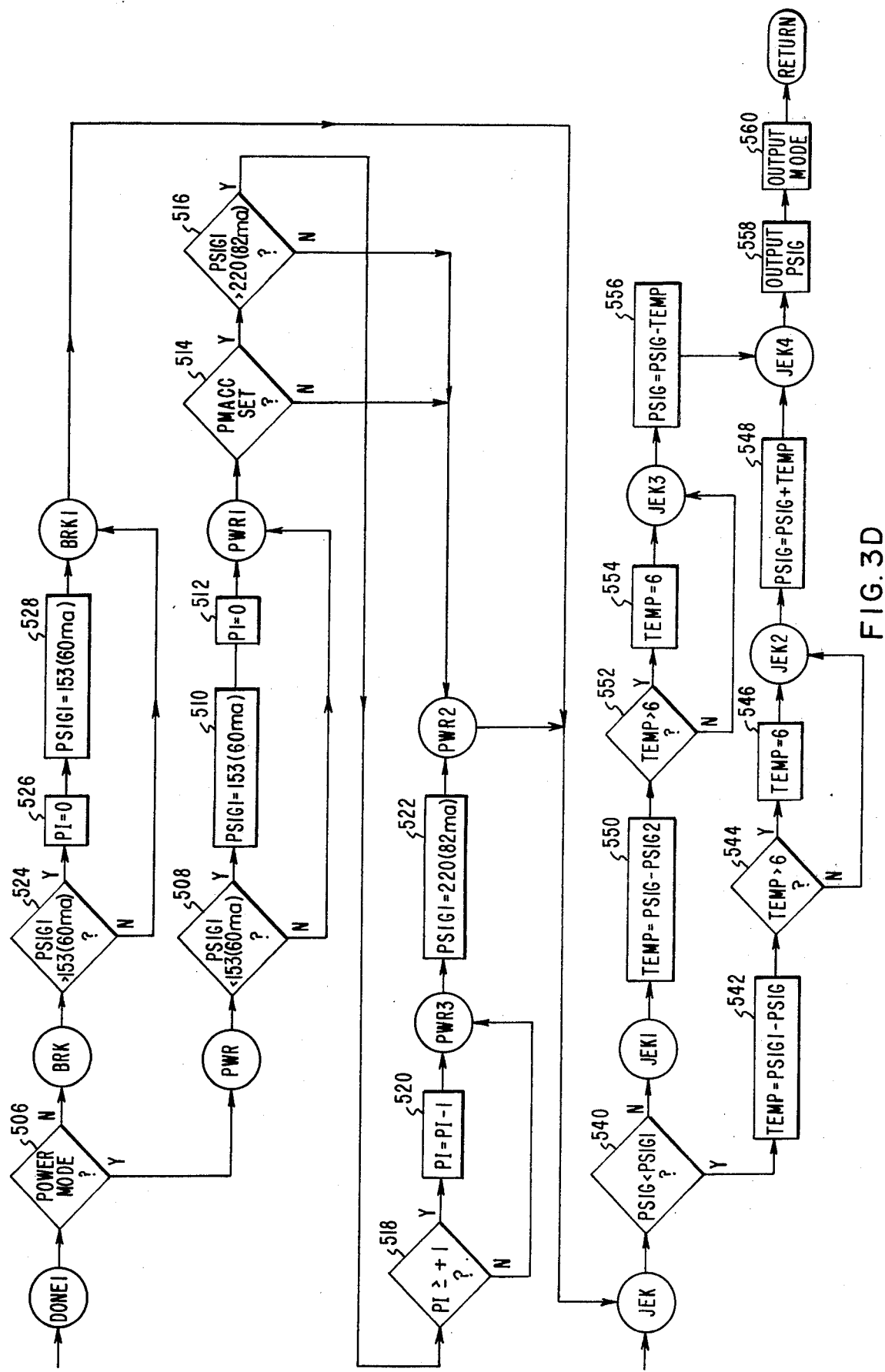

Since the program shown in FIG. 3B is working with unsigned numbers, the absolute value of speed error is calculated and then a flag is set to indicate whether it is overspeed or underspeed. At block 440 a check is made to see if actual speed is greater or equal to the reference velocity. If it is not and the vehicle is going slower than the reference velocity, at block 442 an underspeed flag is set, and at block 444 the speed error prime is set equal to the reference minus the tach. At block 440 if the vehicle speed is equal to or above the reference speed, then at block 446 the underspeed flag is set equal to zero and at block 448 the speed error prime SE′ is set equal to the tach minus the reference, which again is the larger number minus the smaller number. It could be the tach is equal to the reference speed, in which case at block 448 this would be the equal minus the equal and the result is zero. At block 450 a check is made to see if this speed error prime is greater than 15, and if so at block 452 it is held to 15; in other words this is the dynamic range on the input where 15 is 7½ KPH plus or minus. If the speed error prime is greater than 15 in block 452, it is set to 15 and if it is not greater than 15 it is left at whatever it is. At block 454 the proportional gain called PP is set equal to 0.K1 times 16 times the speed error, where 16 is just a scale factor to increase the resolution, and 0K1 is used because the multiplication is an eight bit number times an eight bit number where what is desired is an eight bit result so that the K1 eight bit number is considered as a fractional portion; in other words it is whatever the number is, divided by 256, times the other number, and the result will be an eight bit number. The maximum value of K1 is effectively 1, and the block 454 multiplies by less than unity gain. The scaling on the ultimate P signal output is 102 which is 40 milliamps, and the control is working from a 60 milliamps point going 40 milliamps higher or 40 milliamps lower, so to provide a limit within that range, at block 456 a check is made to see if the PP term is greater than 102 which is the maximum limit. The range in either power or brake is 40 milliamps, and at block 456 a check is made to see if the PP term is greater than 40 milliamps, and if it is then at block 458 it is set to what corresponds to 40 milliamps and if it isn't then the PP term is left at whatever it is. At block 460 in relation to numerical integration, the delta integral term PI1, in other words, that which is changed since the last time, is set equal to 0.K2 times the speed prime, which provides the change in the integral term since the last time through this program at 18 times a second. At block 462, if the underspeed flag is equal to zero, then the program goes to overspeed and if it not equal to zero the program goes to UNSP. Taking the underspeed case out of block 462, at block 464, since it is desired to simulate the PI controller, which is proportional to the ratio of the two capacitor values and the integral portion is proportional to R1 and C2. The advantage of doing the controller this way is any time the output of the amplifier of this PI controller is in saturation, the integral portion is essentially reset and the integral portion always has a maximum value of the difference between what the output is and the saturation limit. This keeps the integral portion of the controller within bounds, so at block 464 PIMAX is set to full scale 102 minus whatever the proportional part is; if it were far enough out that the proportional part is full scale, then PIMAX is zero. At block 466 the integral portion is set to the past value plus the change which is PI plus PI1 and this is digital integration. At block 468 a check is made to see if PI is positive, and if it is positive, at block 470 a check is made to see if it is greater than PI max. At block 472 if PI is greater than PI max, then PI is set to PI max. If PI is not positive at block 468 or less than PI max at block 470, then PI is left at whatever it was. At block 474 PSIG1 (P signal 1) is set equal to 153, which is the midpoint corresponding to 60 milliamps, plus the proportional portion PP plus the integral portions PI minus K3 which is the lead term. The only time the lead term K3 is used is in the brake mode, which means K3 even if it is a positive value wants to get treated like a negative value going towards a lower P signal value so it is always subtracted, and its sign is not carried through.

If at block 462 the vehicle is going too fast and is above the reference speed, then at block 476 PI max is set equal to 102 minus the proportional portion PP, and since the vehicle is overspeed and now working in this region from 60 milliamps down to 20 milliamps, the K3 lead term is subtracted. For the typical speed maintaining K3 is at zero, but in program stop K3 has some value. At block 476 PP is subtracted which can be up to a value of 102 and K3 is subtracted which can result in a non-zero value, so P max at block 476 could go below zero and go negative in which case it should be made zero; again the program is now working with signed numbers, but is handling the signs as either an addition or subtraction based on underspeed or overspeed. The minimum value of PI max should be zero, so at block 478 a check is made to see if it went below that, and if it did, at block 480 it is set to zero; otherwise PIMAX is left at what it was. At block 482, since the vehicle is going too fast, the integral portion is essentially going less positive and more negative, so it is desired to subtract this delta amount PI1 from whatever the past value was, so PI is set equal to PI minus PI1. At block 484 a check is made to see if PI is negative. If it is, at block 486 a check is made to see if the absolute value of PI is greater than PI max. If PI is negative, it is desired to see if the value of PI is less than the maximum value PI max. If it isn't, then at block 488 PI is set equal to minus PI max. If PI is not negative at block 484, or the magnitude is less than its allowed magnitude at block 486, the program skips block 488. At block 490, PSIG1 is generated as the 153, or 60 milliamps, midpoint, minus K3 plus PI and minus PP. PI is added because it can be a negative number, so it takes care of its own sign. The proportional part PP, since the vehicle is in overspeed, is a positve magnitude, but it should be subtracted from the P signal. So block 490 calculates PSIG1. At block 490, since the program subtracts PP and K3, the PSIG1 can actually go below the minimum value which is 51, so at block 492 a check is made to see if it is less than the equivalent of 20 milliamps, and if it is, at block 494 it is held to 20 milliamps. Either one of the underspeed or the overspeed path goes to block 496, where a check is made to see if the P signal PSFG1 is not equal to zero. If the vehicle is in program stop, then it would be nice to be able to get the vehicle back into the power mode if it is going too slow. At block 498 a check is made to see if PSIG1 is greater than 63 milliamps, and if it is then at block 500 the power mode is set. At block 498, if PSIG1 is not greater than 63 milliamps, then at block 502 a check is made to see if it is less than 147 which represents 57 milliamps. If PSIG1 is not less than 147, this program is done, and if it is, then at block 504 the brake mode is set, so this is doing hysteresis on the P signal to determine brake or power mode if the vehicle is in program stop. At block 496, if the vehicle is not in program stop, at block 506 a check is made to see if it is in power mode. If the vehicle is in power, at block 508 a check is made to see if the P signal is less than 153 or 60 milliamps; the vehicle is in power mode and the P signal should be less than 60 milliamps. If not, it is held to 60 milliamps at block 510, and since the only thing that can take the P signal to less than 60 millamps is the integral portion PI, it is reset to zero at block 512. Then at block 514 a check is made to see if PMACC is set, and that is the indication that a limit of half the acceleration is desired. If that is set at block 516, a check is made to see if the P signal is greater than 220 corresponding to 82 milliamps, which is one-half acceleration. At block 518 the integral controller PI is checked to see if it is equal to or greater than +1; the integral portion PI of the controller is the reason for the higher P signals. If it is, at block 520 1 is subtracted from PI. If the P signal is above 82 milliamps at block 516, at block 522 it is limited to 82 milliamps. At block 506, if the vehicle is not in power, it is in brake. At block 524 a check is made to see if the P signal is above 60 milliamps, and it is at block 526 that the integral portion PI of the controller is set to zero, and at block 528 the P signal is limited to 60 milliamps. The program now goes to the jerk limit program which jerk limits the P signal.

At block 540 a check is made to see if the P signal is less than PSIG1, and if it is, at block 542 the difference is established. At block 544, if that difference is greater than 6, it is limited to 6 at block 546. At block 548 the P signal is set equal to the P signal minus that limited difference temp. Back to block 540, if the P signal is not less than PSIG1, then at block 550 the program again finds the difference between the two values. At block 552 if this difference temp is greater than 6, it is limited to 6 at block 554. At block 556 the P signal is set equal to the P signal minus the difference temp, and then functions such that the P signal will go towards the PSIG1 at the maximum rate of 6 units for each pass through the program every 18th of a second, and 6 times 18 is 108, so the jerk limiter permits a change of 108 units in one second. Since 102 is a full scale range for the P signal, it can go from essentially 60 milliamps to 100 milliamps, or from 60 milliamps to 20 milliamps in just slightly less than 1 second, and a one second limiting rate is desired. At block 558 the P signal is output. At block 560 the output mode is used to turn the brake signal on or off.

Figures 4, 5:
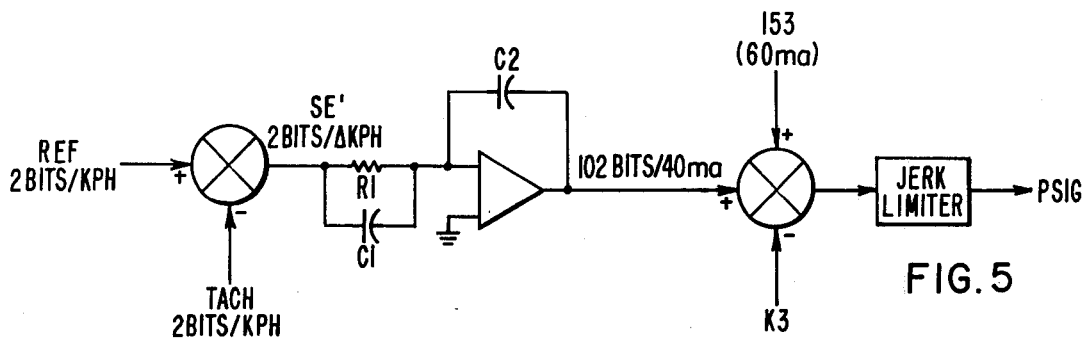
FIG. 4 is a memory storage table showing the address locations of the variables stored in RAM.
FIG. 5 is a functional illustration of the here provided PI controller apparatus.

The tables in FIG. 4 show the RAM variables K1, K2 and K3 which are the gain constants set by the program. The PSIG1 in location 053 is the unjerk limited P signal request. PI is the integrator results; it is the output of the integrator, and it is a double byte. The integral component PI1 of the controller is the change every 18th of a second, and it is again a double byte variable. These are double bytes since the program is working with such small units on a per cycle basis, if only an eight bit resolution were provided this delta PI might always be zero and could be lost as a result of rounding error. The following table is provided to define the various labels shown in FIG. 4 of the drawings.

| LABEL: | DEFINITION: |
|---|---|
| K1 | Proportional Gain Constant |
| K2 | Integral Gain Constant |
| K3 | Offset Constant |
| PSIG1 | P-Signal before Jerk Limiting |
| PI | Integrator Result |
| PI1 | Change in Integrator Result per 1/18 second = K2* \|tach − reb\| |
| UNDER | Flag, = FF when tach < command, = 0 when tach ≧ command |
| PP | Proportional Result = K1* 16* \|tach − comm\| |
| PIMAX | Maximum Value for Integer Portion of PI such that PI + PP never exceeds full scale (± 40 ma) |
| PSFLG | Flag Set first time thru Prog Stop Routine, 0 = was not in Prog Stop FF = was in Prog Stop |
| SPDER | Speed Error (Comm − Act) used for monitoring only |
| K3 TMP | Temporary Storage for K3 |
| PSFG1 | Flag to indicate in Prog Stop 0 = not in Prog Stop 1 = In Prog Stop |
| OUT61 | Output Port 61 Storage |
| BRK-SIG | Generator Control Bit, 0 = On = In Power, 1 = Off = In Brake |
| VELAC | Action Velocity = Lessor of Speed Code or PM Speed 2 bits/KPF |
| VELPS | Program Stop Velocity = function of distance to go 2 bits/KPF |
| VELLA | Prog Stop look ahead velocity = VELPS one second from now 2 bits/KPF |
| PSIG | P-signal − after Jerk Limiter (102 bits = 40 ma) |
| PMACC | 1 = ½ acceleration max, 0 - full acceleration allowed |
| IN73 | Data from input port 73 |
| $\overline{\text{COC 86}}$ | Either bit = 0 means follow reduced acceleration |
| COC 71 | Prog Stop Profile |
| ACTSP | (Tach) Actual Train Velocity 2 bits/KPH |
| REF | Reference Velocity = VELPS lb in Program Stop = VELAC - 4 KPH lb in Power = VELAC - 2 KPH lb in Brake |

The purpose of the speed maintaining program is to control the train velocity through a train acceleration request, and this acceleration request is based on the received speed code, the train vehicle actual speed and the program stop desired velocity. The program takes this speed code velocity or the program stop velocity, whichever is lower, and looks at how they are converging. If they are converging, the program combines this with the vehicle actual speed tachometer information to come up with an acceleration control for the vehicle such that the vehicle will follow the more restrictive of these speeds. In the prior art an acceleration request was generated from the speed code and the tach and also from the program stop velocity and the tach and whichever was asking for less acceleration or more deceleration, that would be the one that would control the speed of the train, such that essentially two separate closed loop velocity control systems were provided and the problem was to stabilize two separate control loops.

The present speed maintaining control apparatus requires only one controller and the restrictive speed selection is provided ahead of that controller. Since the speed code velocity is typically not changing and the program stop velocity is changing, it is not desired that the vehicle should make a sudden change in acceleration to follow this changing control signal, so the look ahead velocity is used to determine when it is time to go in the program stop operation and follow the program stop velocity, so the transition is based on the time and the difference between the program stop velocity and the amount of the P signal that is presently being requested which is an indication of the present actual acceleration. This permits the vehicle to start going into brake a little bit sooner than might be obvious from just looking at the exact program stop velocity to get the proper acceleration or deceleration for the train to approximately follow the program stop velocity and not end up overshooting. Before the vehicle approaches a station both the program stop velocity and the look ahead velocity are large numbers. When the vehicle senses the program stop tape the latter two velocities become some numbers which are larger than the present speed maintaining velocity, and then these two numbers in the program stop will start decreasing as the vehicle continues into the station. The look ahead velocity is compared against the speed that the vehicle is going plus the offset term which is a function of the amount of P signal requested to allow the vehicle to be accelerating towards the program stop curve and to be in program stop sooner than if maintaining constant speed because it would take longer to jerk limit out of this acceleration into the program stop braking rate. Ideally, it is desired to hit the program stop velocity at the program stop nominal deceleration rate which is 0.85 meters per second. The look ahead velocity and the P signal are used to determine when the vehicle will go into program stop, and the K3 lead term in software is set to the nominal P signal acceleration or deceleration so the train signal will start going towards the deceleration rate and hopefully when it reaches that decleration rate it will be on the program stop curve. The P signal offset causes the train vehicle to start decelerating, and then instead of using the reference velocity with the tachometer for speed maintaining, the program stop velocity versus the tachometer is used to generate the P signal, plus the P signal is forced toward brake at this time. It turns out that when this is done the program stop velocity is still above the vehicle actual velocity so the train wants to speed up, however this offset is saying for the train to slow down, and there is an open loop operation where the vehicle wants to be slowing down, but yet the speed error is requesting a speed-up, and the two signals sort of oppose each other, and by the time the P signal goes into brake then starts coming off in a jerk limited manner, the vehicle is on the program stop curve. This allows the vehicle to hit the program stop curve tangentially, even though it might have been accelerating before going into the program stop. The look ahead velocity is treated as if it is just a parallel but lower velocity curve to the program stop velocity. When the vehicle is on the program stop curve and now the controller is looking at the difference between the program stop velocity and the actual velocity to control the P signal, there is still the offset in the P signal. To allow the train vehicle to follow the flare-out at the end of a program stop, at a particular speed approximately where the program stop table starts its flare-out, the offset starts to be removed. This allows the train to follow the flare-out of the program stop curve. Since the theoretical acceleration of the program stop table is increasing, becoming less negative down at the low speeds, the P signal should start asking for less brakes at the lower speed.

The speed maintaining is set up so that a 2 KPH deadband is provided. As long as the vehicle is 4 KPH below the commanded speed, it will stay in power until it gets to 2 KPH below the commanded speed, and then it will go into brake and stay in brake until it gets back to 4 KPH below the speed command. If the vehicle is in program stop, the power brake change over is purely determined by how much P signal is requested; if it is for more than 63 milliamps, the vehicle goes into power, and if it is for less than 57 milliamps the vehicle goes into brake.

In FIG. 5 there is functionally shown an emulation of the PI controller system of the present invention. The proportional gain relationship is as follows:

$$\frac{C1}{C2} = \frac{K1}{256} * 16 * \frac{2 \text{ bits}}{KPH} * \frac{40 \text{ ma}}{102 \text{ bits}} \text{ in ma}/\Delta KPH$$

The normal operational limits for the proportional gain are:

|  | ma/ΔKPH |
| --- | --- |
| Brake | 6.27 |
| Power | 6.27 |
| Program Stop | 7.84 |
| Program Stop Final | 9.41 |

The integral time constant relationship is as follows:

$$\frac{1}{R1C2} = \frac{K2}{256} * \frac{26.71}{KPH} * \frac{40 \text{ ma}}{102 \text{ bits}} * \frac{18 \text{ times}}{\text{sec.}}$$

in ma/ΔKPH sec.

The normal operational limits for the integral time constant are:

|  | ma/ΔKPH/sec. |
| --- | --- |
| Brake | 0.88 |
| Power | 0.88 |
| Program Stop | 0.44 |
| Program Stop Final | 0.44 |

These gain relationships can easily be changed for a system where speed is denoted in miles per hour.

We claim:

1. In aparatus for controlling the actual velocity of a passenger vehicle moving along a track including track circuits in response to a desired velocity signal provided in accordance with a selection between an action velocity signal and a program stop velocity signal, with said action velocity signal corresponding to one of a command code velocity signal received from said track circuits, a cutout car modified velocity signal and a performance restriction modified velocity signal, the combination of means coupled with said vehicle for providing an actual velocity signal, means for providing an effort request signal for controlling the actual velocity of said vehicle by comparing the desired velocity signal with the actual velocity signal, means providing an offset to said action velocity signal in accordance with a predetermined relationship with said effort request signal and means coupled with said vehicle and responsive to said effort request signal for controlling the actual velocity of the vehicle.

2. The actual velocity controlling apparatus of claim 1, with said effort request signal providing means being responsive to a desired velocity signal in accordance with an action velocity signal provided corresponding to said one velocity signal that provides the lowest actual velocity of the passenger vehicle.

3. The actual velocity controlling apparatus of claim 1, with said offset providing means providing an offset having a low value for a maximum deceleration effort request signal, having a high value for a maximum acceleration effort request signal, and having a middle value for a zero acceleration effort request signal.

4. The actual velocity controlling apparatus of claim 1 with said offset providing means providing an offset making a smooth transition into a program stop operation in response to said program stop velocity signal and then subsequently removing that offset to follow a predetermined flare-out of the program stop.

5. In apparatus for controlling the actual velocity of a passenger vehicle moving along a track including track circuits in response to a desired velocity signal provided in accordance with a selection between an action velocity signal and a program stop velocity signal, with said action velocity signal corresponding to one of a command code velocity signal received from said track circuits, a cutout car modified velocity signal and a performance restriction modified velocity signal, the combination of means coupled with said vehicle for providing an actual velocity signal, means for providing an effort request signal for controlling the actual velocity of said vehicle by comparing the desired velocity signal with the actual velocity signal, means for detecting an overspeed operation of the passenger vehicle for applying a brake effort to reduce the velocity of the vehicle until the overspeed operation is corrected and then removing said brake effort such that by the time the brake effort is actually removed the vehicle will be at substantially the velocity of operation determined by said effort request signal, and means coupled with said vehicle and responsive to said effort request signal for controlling the actual velocity of the vehicle.

6. The actual velocity controlling apparatus of claim 5, with said overspeed operation detecting means setting the effort request signal to a predetermined value when the overspeed operation is corrected for removing the brake effort.

7. In apparatus for controlling the actual velocity of a passenger vehicle in accordance with at least one of an input command velocity signal, an input modified velocity signal and an input program stop velocity signal, and providing a first velocity signal in accordance with a selected one of said input velocity signals, the combination of means coupled with said vehicle for providing an actual velocity signal, means for providing an effort request velocity signal for controlling the actual velocity of said vehicle in response to the first velocity signal and the actual velocity signal, with said effort request velocity signal providing means including a controller having a proportional operation and an integral operation, means for determining the integral operation in relation to the proportional operation such that when the controller is in saturation the integral operation is substantially zero to prevent said integral operation from causing an overspeed or an underspeed of the passenger vehicle, and means coupled with said vehicle and responsive to said effort request signal for controlling the actual velocity of said vehicle.

8. The actual velocity controlling apparatus of claim 7, including means for holding said integral operation substantially at zero until the actual speed of the vehicle is within a predetermined relationship with said first velocity signal.

9. The actual velocity controlling apparatus of claim 8, when said first velocity is provided in accordance with one of the input command velocity signals and the input modified velocity signal, including means responsive to a second velocity signal having a predetermined relationship to said input program stop velocity signal for causing said first velocity signal to be provided in accordance with said input program stop velocity signal.

10. The method of controlling the actual velocity of a passenger vehicle operative with an input velocity signal, a program stop velocity signal, a look-ahead velocity signal related to that program stop velocity signal, and a reference velocity signal with said actual velocity control being in accordance with a predetermined selection between one of said input velocity signal and said program stop velocity signal, including the steps of determining an actual velocity signal for said vehicle, determining an effort request velocity signal for controlling the actual velocity of said vehicle in response to said reference velocity signal and said actual velocity signal, and determining an offset to said reference velocity signal when responding to said input velocity signal for improving the transition into response to the program stop velocity signal.

11. The method of controlling the actual velocity of a passenger vehicle having a power mode of operation and a brake mode of operation in response to a reference velocity signal in accordance with a program stop velocity signal, including the steps of determining an actul velocity signal for said vehicle, determining an effort request signal for controlling the actual velocity of the vehicle in response to the reference velocity signal and the actual velocity signal, controlling said vehicle in response to said effort request signal in the power mode of operation when the reference velocity signal is greater than the actual velocity signal and controlling said vehicle in response to said effort request signal in the brake mode of operation when the actual velocity signal is greater than the reference velocity signal, and providing a minimum brake condition for said vehicle in relation to a predetermined effort request signal and an adjustable control characteristic between the power mode of operation and the brake mode of operation.

* * * * *